United States Patent
Tatsumi

[19]

[11] Patent Number: 5,803,011
[45] Date of Patent: Sep. 8, 1998

[54] VEHICLE WITH HULL

[76] Inventor: Akira Tatsumi, 3-2-10, Omachinishi, Sakai, Osaka, Japan

[21] Appl. No.: 966,645

[22] Filed: Nov. 10, 1997

Related U.S. Application Data

[63] Continuation of Ser. No. 751,835, Nov. 18, 1996, abandoned.

[51] Int. Cl.⁶ ...................................................... B63B 17/00
[52] U.S. Cl. ......................... 114/343; 296/213; 296/157
[58] Field of Search .................................... 114/352, 354, 114/355, 357, 347, 343, 364, 56; 296/210, 213, 157

[56] References Cited

U.S. PATENT DOCUMENTS

| | | | |
|---|---|---|---|
| 3,488,084 | 1/1970 | Ekstrom | 296/157 |
| 3,933,112 | 1/1976 | Veazey | 114/343 |
| 4,036,520 | 7/1977 | Zuidema | 296/157 |
| 4,635,580 | 1/1987 | Nishida | 114/357 |
| 4,790,256 | 12/1988 | Levine | 114/352 |
| 5,148,763 | 9/1992 | White | 114/352 |

*Primary Examiner*—Ed L. Swinehart
*Attorney, Agent, or Firm*—Moonray Kojima

[57] ABSTRACT

The invention relates to a vehicle with hull having a hull serving as a roof when mounted on a car detachably fixed on the upper part of a car body, and by detachably mounting and fixing the hull with the ship's bottom directed upward on the upper part of the car body of the vehicle from which the roof is removed, particular carriage is not needed when transporting the hull, and the Overall length is not extended when transporting the hull, and moreover the hull can be used as the roof when mounted on the car, and when dismounted, it can be used as the hull itself.

2 Claims, 11 Drawing Sheets

VEHICLE WITH HULL

This is a continuation of Ser. No. 08/751,835 filed Nov. 18, 1996, now abandoned.

BACKGROUND OF THE INVENTION

1. Field of the Invention

The present invention relates to a vehicle with hull having the hull servicing also as the roof detachably fixed on the upper part of a car body when mounting on the car.

2. Description of the Prior Art

Hitherto, for transportation of a hull of a boat or the like by vehicle, a carriage was towed behind the vehicle, and the hull of the boat or the like was fixed on this carriage by proper means, generally, and it required the carriage and the overall length of towing the hull was long.

SUMMARY OF THE INVENTION

It is hence a primary object of the invention to present a vehicle with hull characterized by detachably mounting and fixing the hull with the ship's bottom directed upward on the upper part of a car body of a vehicle from which the roof is removed, and therefore carriage is not needed when transporting the hull, the overall length is not long when transporting the hull, the hull can be used as the roof when mounted on the car, and it can be used as the hull itself when dismounted.

It is other object of the invention to present a vehicle with hull comprising plural lock means for detachably mounting the hull on the upper part of a car body, so that the hull can be securely fixed on the upper part of the car body by these lock means.

Claim 3 of the invention, together with the above purposes of claim 1 and claim 2 of the invention, presents a vehicle with hull comprising a sheet member for covering the upper part of the car body when the hull is dismounted from the upper part of the car body, thereby preventing rain water, wind or foreign matter from invading into the compartment by the sheet member, and assuring the protective performance of the compartment.

It is a different object of the invention to present a vehicle with hull characterized by forming a rain rail used as a gutter in the hull marginal area when the hull is mounted on the car, so that the rain water may flow down through the rain rail at the hull side without having to form a rain rail separately on the car body side.

It is a further different object of the invention to present a vehicle with hull capable of constituting a hull of an effective size in space by setting a high roof type wagon or bus as the vehicle.

Other objects of the invention will be better understood from the following description of the embodiment.

DESCRIPTION OF THE PREFERRED EMBODIMENTS

Referring now to the drawings, an embodiment of the invention is described in detail below.

Figure 1:
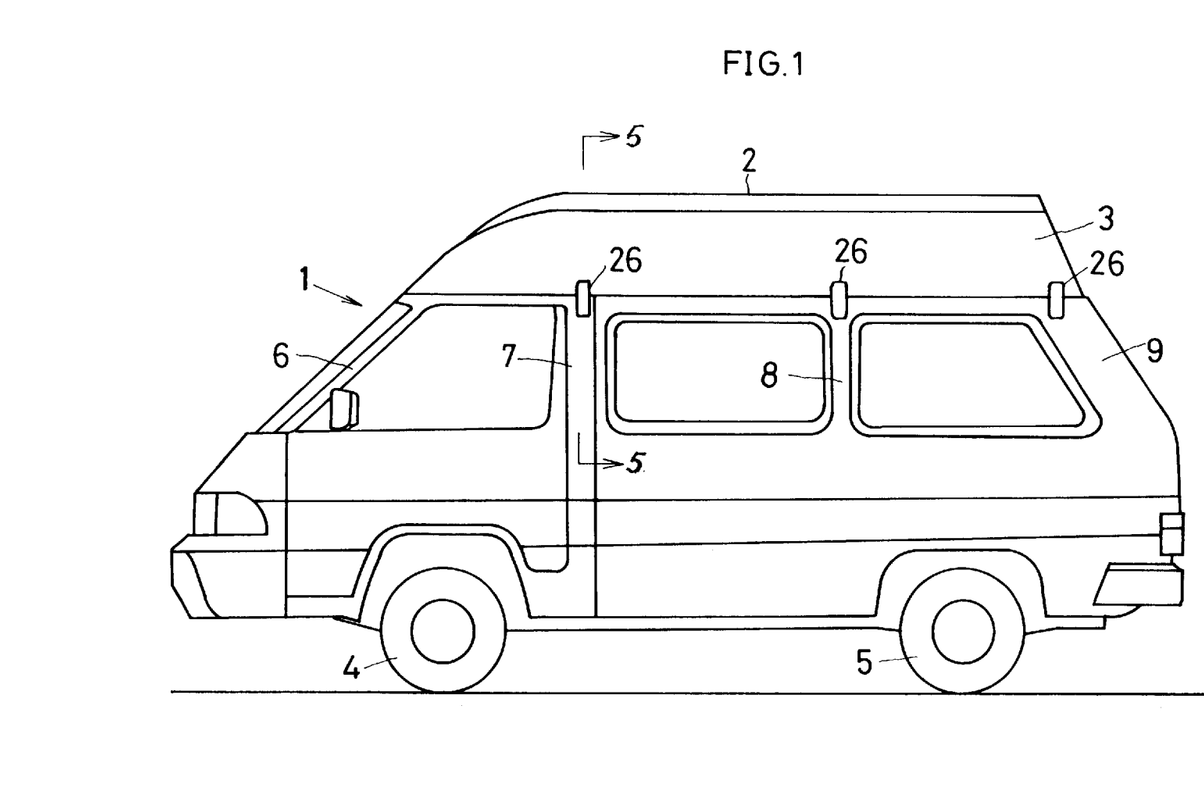
FIG. 1 is a side view showing a vehicle with hull of the invention.
Figure 2:
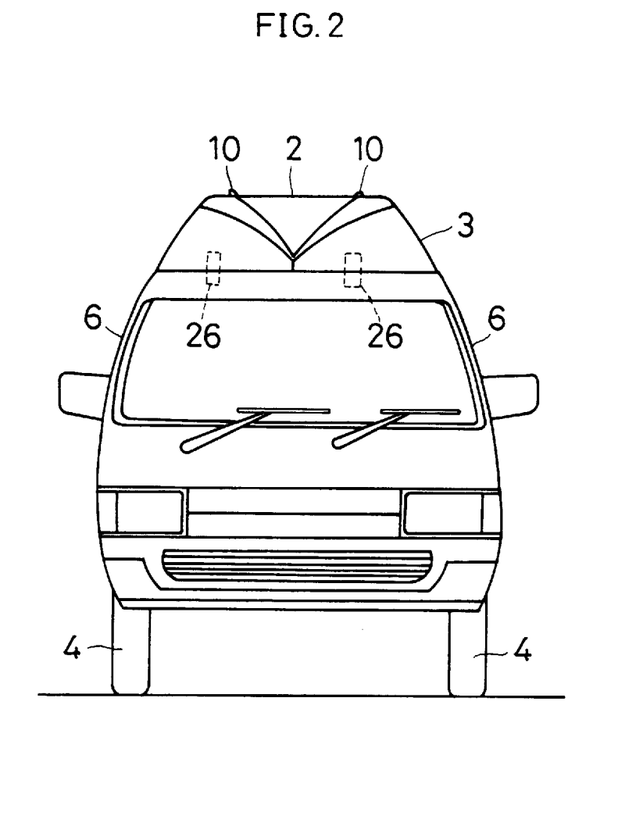
FIG. 2 is a front view of a vehicle with hull.
Figure 3:
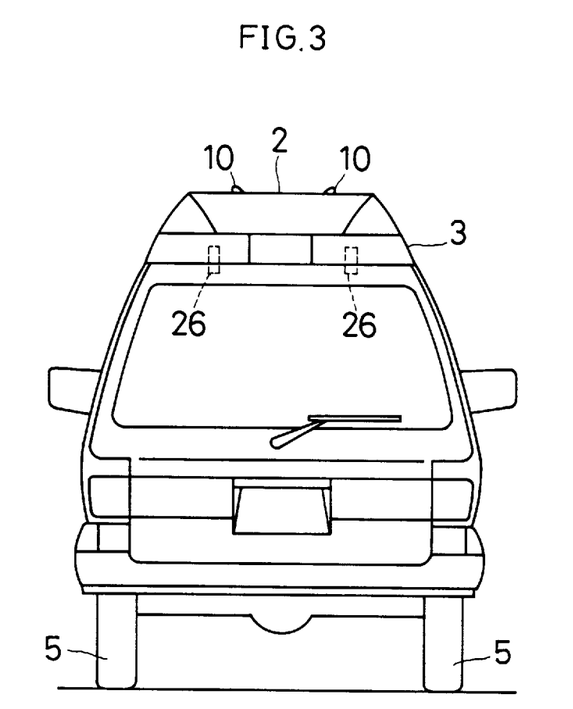
FIG. 3 is a rear view of a vehicle with hull.

The drawings show a vehicle with hull, and in this vehicle with hull shown in FIG. 1, FIG. 2 and FIG. 3, a hull 3 is detachably mounted on the upper part of a car body of a vehicle 1 of high roof type wagon from which the roof including the roof panel is removed, with the ship's bottom 2 directed upward.

The vehicle 1 comprises front wheels 4, rear wheels 5, front pillar 6, center pillar 7, middle pillar 8, rear pillar 9, and others.

Figure 4:
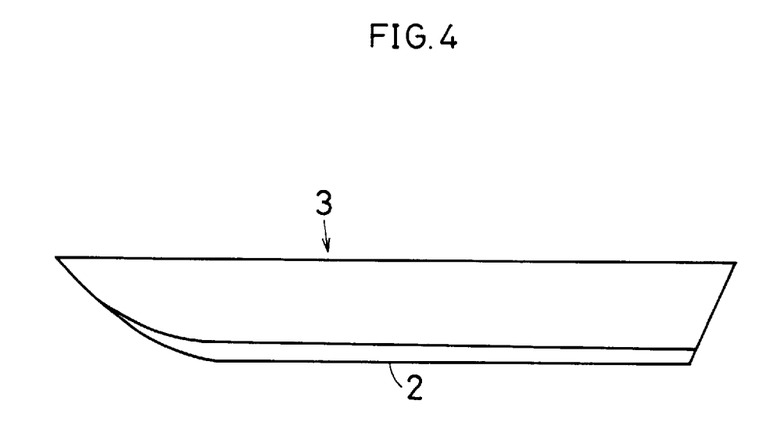
FIG. 4 is a side view of a hull.

On the other hand, the hull 3 has a keel 10 as skeleton, and is used as the roof (the vehicle roof) when mounted on the car as shown in FIG. 1 to FIG. 3, and when dismounted as shown in FIG. 4, it is used as the hull itself. That is, the hull 3 serves both as the vehicle roof and the hull 3 itself.

Figure 5:
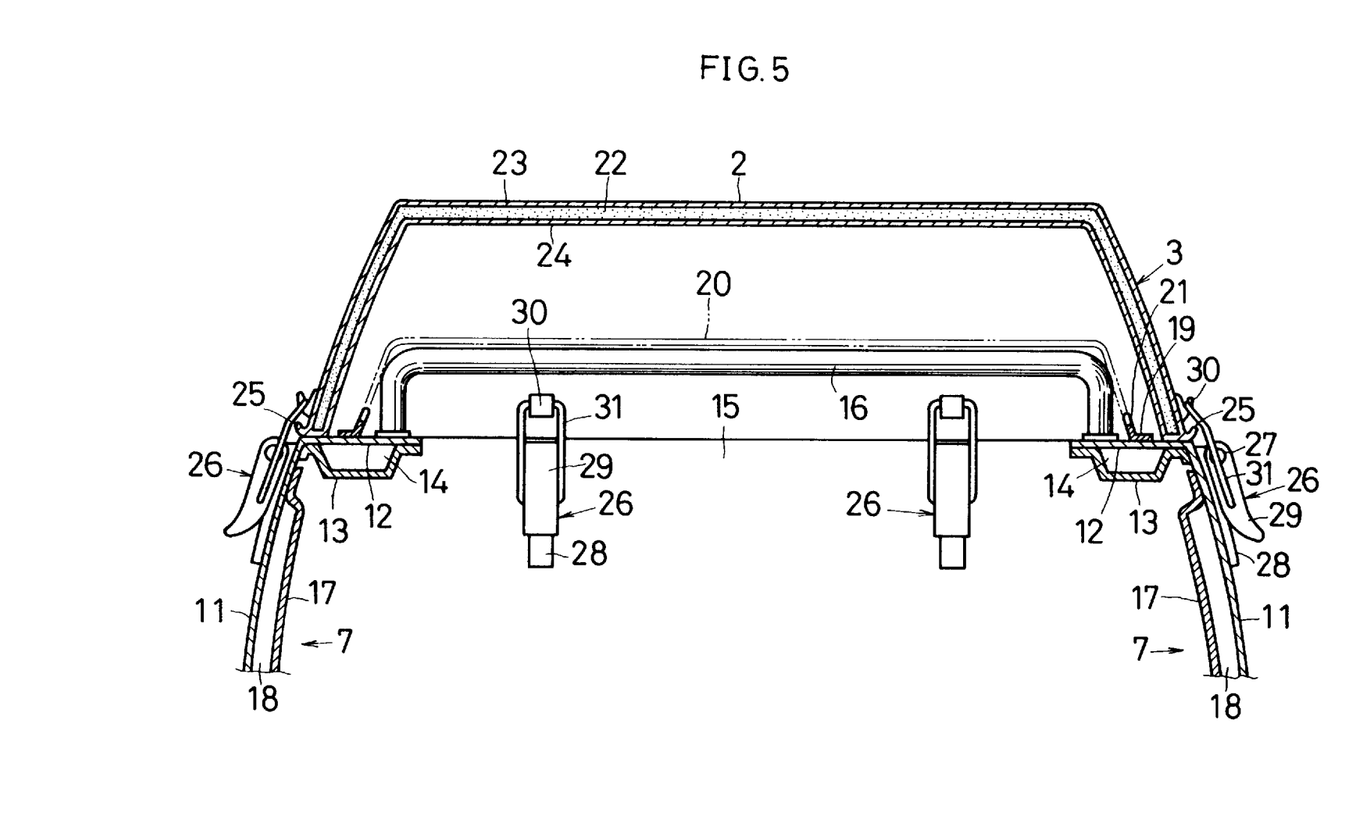
FIG. 5 is a sectional view in 5—5 arrow view of FIG. 1.
Figure 6:
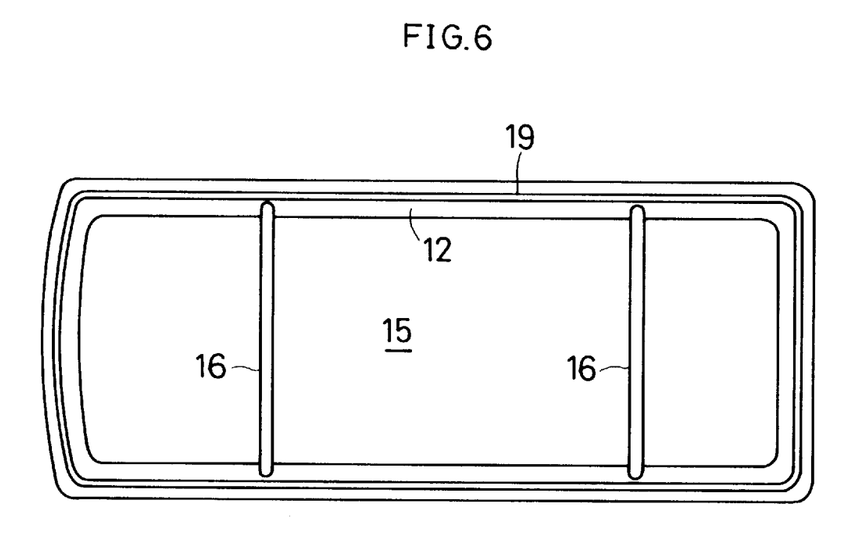
FIG. 6 is a plan view of essential parts showing a roll bar extension structure.

A car body outer plank 11 in the upper part of the vehicle 1 from which the roof is removed as shown in FIG. 5 is folded horizontally, and a frame shaped hull mounting strip 12 is formed as shown in FIG. 6, and reinforcements 13, 13 extending in the longitudinal direction of the car body are joined to the lower surface of the hull mounting strip 12 to form a closed section 14, so that the strength of the upper part of the car body forming an opening 15 is increased. The right and left reinforcements 13, 13 are preferred to be extended between the front header and rear header.

The right and left upper sides of the hull mounting strip 12 are coupled by two roll bars 16, 16 (reinforcing means) extending in the direction of car breadth so as to assure a sufficient strength in the upper part of the car body having the opening 15. As the roll bars 16, metal pipes can be used.

In FIG. 5 as an a sectional view of FIG. 1, pillar inners 17, 17 extending in the vertical direction are joined to the inside of the car body outer plank 11, and the center pillar 7 having a pillar closed section 18 is composed of these members 11, 17. The other pillars 6,8, 9 are also composed so as to increase the car body strength and car body rigidity similarly by the pillar closed section structure.

On the hull mounting strip 12, as shown in FIG. 5 and FIG. 6, a cloth or other fastener holding member 19 is disposed in an annular form, and a fastener 21 is attached to the inner peripheral side of the fastener holding member 19 and the outer peripheral side of a sheet member 20, so that the entire sheet member 20 may be detached or attached (full surface detaching or attaching).

Herein, the fastener 21 is designed to be engaged and disengaged by sliding the teeth fixed on the fastener tape of one side and the teeth fixed on the fastener tape of other side, and the fastener tape of one side having the teeth is attached to the inner peripheral side of the fastener holding member 19, and the fastener tape of other side having the teeth is attached to the outer peripheral side of the sheet member 20.

Figure 7:
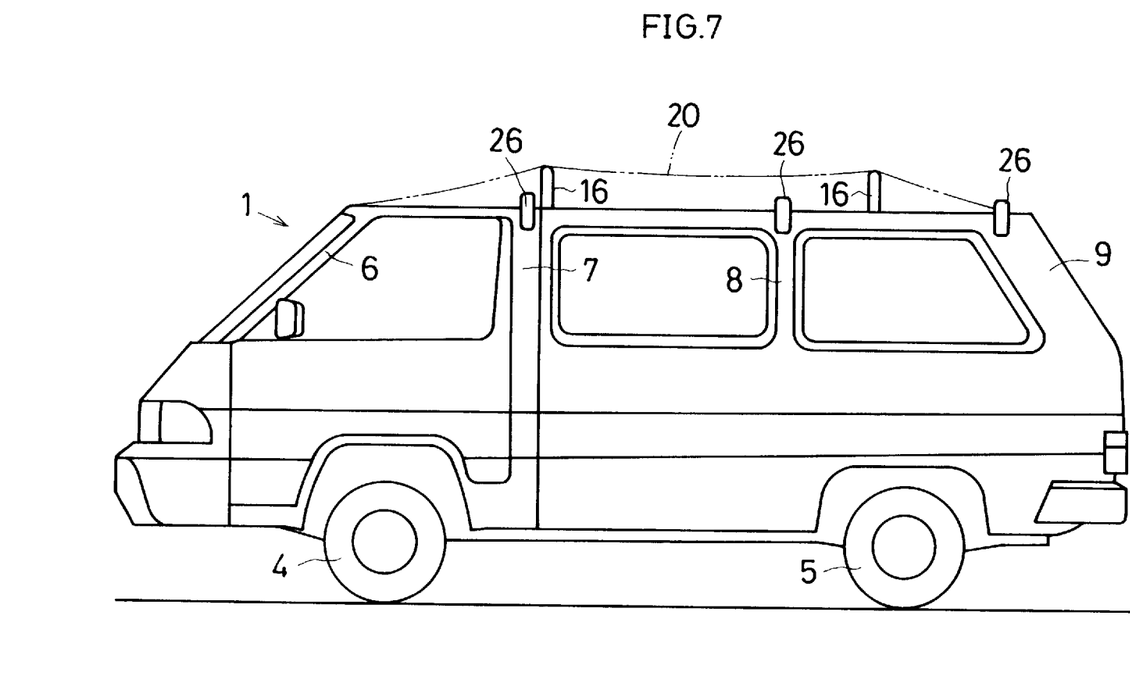
FIG. 7 is a side view of a vehicle from which a hull is dismounted.

The sheet member 20 is made of cloth, leather, synthetic leather or synthetic resin having the outer surface waterproofed, and when the hull 3 is dismounted from the upper part of the car body as shown in FIG. 7, this sheet member 20 covers the entire surface of the opening 15 of the upper part of the car body to prevent rain water, wind or foreign matter from invading into the compartment. When covering the opening 15 entirely by the sheet member 20, the sheet member 20 is positioned above the roll bars 16,16, so that drooping of the sheet member 20 is prevented by the roll bars 16.

The hull 3 is, as its section is shown in FIG. 5, formed in a sandwich enclosed integral structure, with the both surfaces of an inner layer 22 of relatively light weight of polyurethane or the like surrounded by outer layers 23, 24 of light weight and high mechanical strength of FRP (fiber reinforced plastic) or the like, and it is formed in a lightweight, safe and rigid structure as the hull 3. Instead of the FRP, the outer layers 23, 24 may be also composed of FRM (fiber reinforced metal), FRTP (fiber reinforced thermoplastic), and others, and as the FRP, for example, CFRP (carbon fiber reinforced plastic) or GFRP (glass fiber reinforced plastic) may be used.

In the outer periphery of the upper edge of the margin of the hull 3, a rain rail 25 is formed integrally to be used as gutter when the hull 3 is mounted on the car as shown in FIG. 5.

When mounting on the car, the hull 3 is detachably mounted and fixed on the upper part of the car body by plural lock means 26, and in this embodiment, the lock means 26 are provided on the rigid areas of the car body in the upper part of the car body outer plank 11 at the right and left sides of the vehicle 1, that is, outer surface of center pillar 7, outer surface of middle pillar 8, outer surface of rear pillar 9, inner surface of front header, and inner surface of rear header, and the hull 3 side and the vehicle 1 side are detachably fixed at a total of 10 positions, that is, at six positions on the outer side of the car and four positions on the inner side. The quantity and mounting positions of the lock means 26 are not limited to the illustrated embodiment.

The lock means 26 possesses a mounting seat 28 having a support shaft 27, an operation piece 29 rotatable about the support shaft 27 of the mounting seat 28, and s stopping lever 31 detachably fitted to a hook 30 at the hull 3 side being fitted to the operation piece 29, and when the operation piece 29 is rotated, the stopping lever 31 is engaged with the hook 30 by the over-the-fulcrum structure. In this embodiment, the mounting seat 28, operation piece 29 and stopping lever 31 of the lock means 26 are provided at the vehicle side, but these elements 28, 29, 31 may be fitted to the hull 3 side, and the hook 30 may be provided at the vehicle side, or other lock means may be used.

In this way, since the hull 3 having the ship's bottom 2 directed upward is detachably mounted and fixed on the upper part of a car body of the vehicle 1 from which the roof is removed, any carriage is not needed when transporting the hull 3, and its overall length is not extended at all. Still more, the hull 3 can be used as the roof (vehicle roof) when mounted on the car, and it can be used as the hull 3 itself when dismounted.

Besides, since plural lock means 26 are provided for mounting the hull 3 detachably on the upper part of the car body, the hull 3 can be fixed securely on the upper part of the car body by the lock means 26.

Moreover, since the sheet member 20 is provided for covering entirely the opening 15 of the upper part of the car body when the hull 3 is dismounted from the upper part of the car body, invasion of rain water, wind or foreign matter into the compartment is prevented by the sheet member 20, and the appearance is favorable when the hull is dismounted, and it is also effective to assure the protective performance of the compartment.

In addition, the rain rail 25 used as gutter when the hull 3 is mounted on the car is formed on the margin of the hull 3, and without having to form rain rail at the car body side, rain water is received in the rain rail 25 of the hull 3 side and flows down.

By using high roof type wagon or bus as the vehicle 1, the hull 3 of an effective size in space can be composed.

Figure 8:
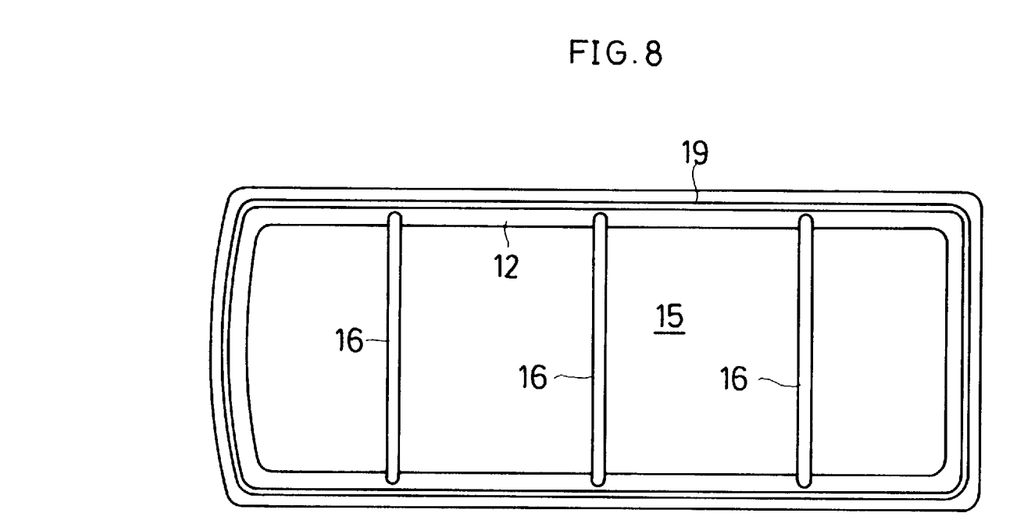
FIG. 8 is a plan view of essential part showing other embodiment of a roll bar extension structure.

FIG. 8 shows other embodiment of roll bar extension structure extended in the direction of car's breadth in the hull mounting strip 12 in the upper part of the car body, in which a total of three roll bars 16 . . . are extended in the direction of car's breadth, and the strength of the upper part of the car body is further increased.

Figure 9:
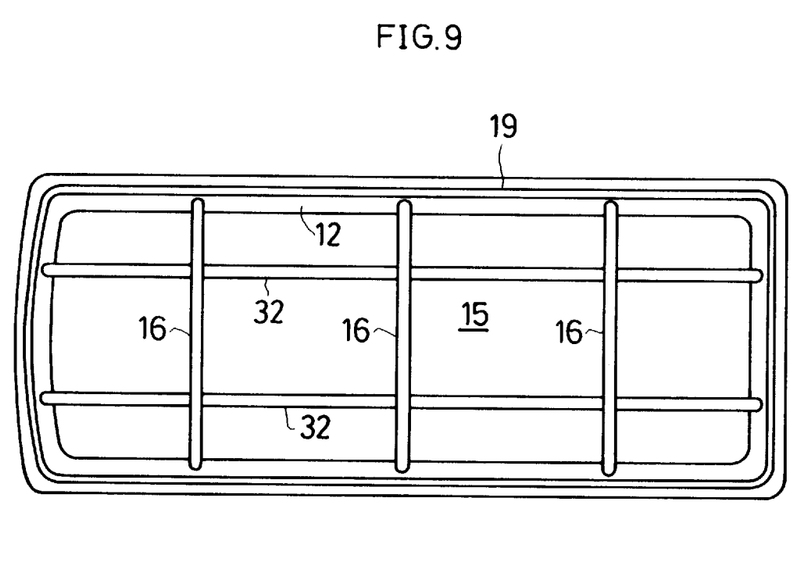
FIG. 9 is a plan view of essential parts showing a different embodiment of a roll bar extension structure.

FIG. 9 shows a different embodiment of the roll bar extension structure, in which, in addition to the constitution of the embodiment in FIG. 8, two roll bars 32, 32 extending in the longitudinal direction of the car body are extended before and after the hull mounting strip 12 to further increase the strength of the upper part of the car body.

When constituted as shown in FIG. 8 and FIG. 9, other points are same in action and effect as in the foregoing embodiment, and same parts as in the preceding drawings are identified with same reference numerals in FIG. 8 and FIG. 9, and detailed description is omitted.

Figure 10:
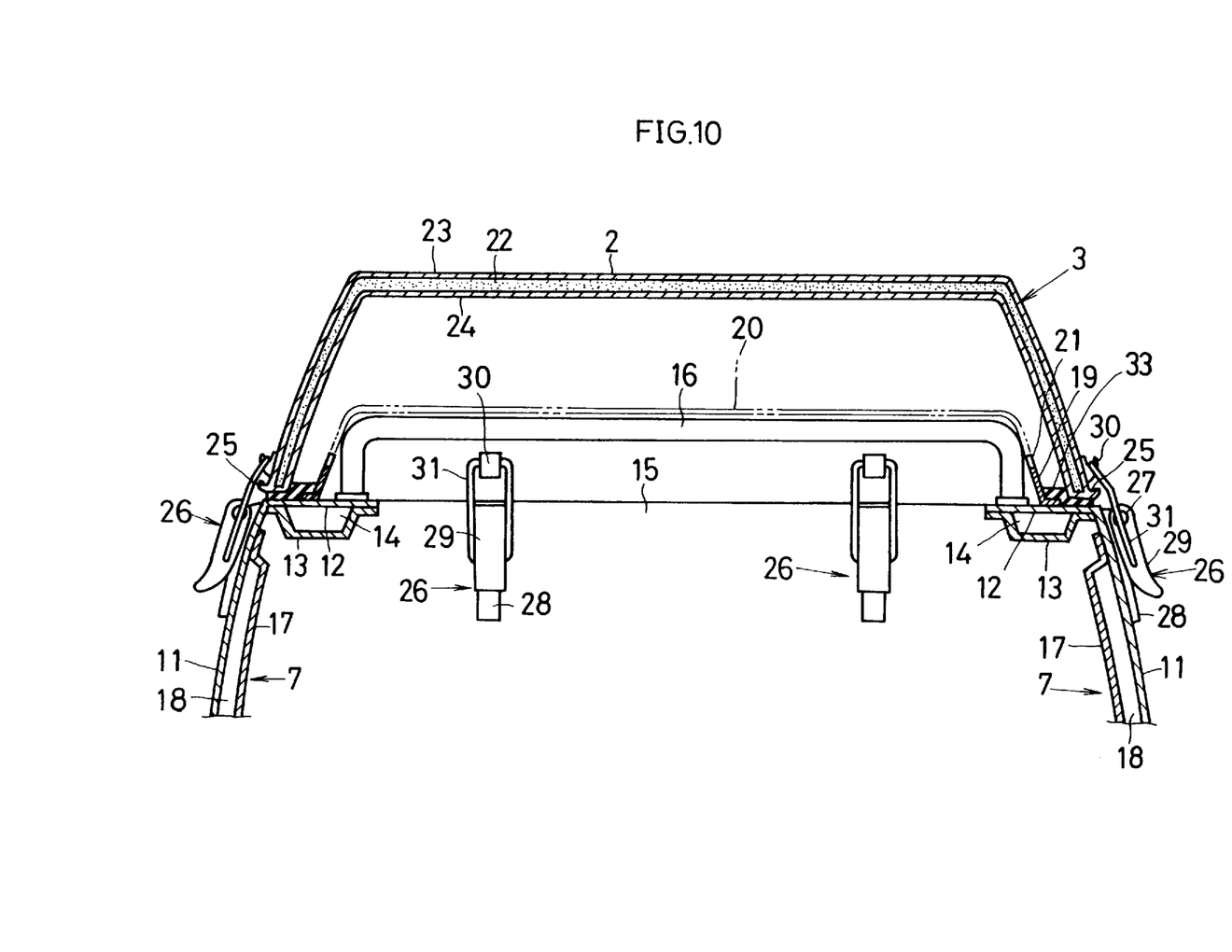
FIG. 10 is a sectional view showing other embodiment of a vehicle with hull.

FIG. 10 shows a further different embodiment of a vehicle with hull, in which a sub-assembled rubber-made, frame-shaped seal member 33 is provided in a stepped lower surface having a fastener holding member 19 position in its inner circumference, the seal member 33 is fixed firmly to the hull mounting strip 12 by proper means such as clip fixing means or adhering means, and the hull 3 on the annular stepped upper surface positioned on the outer circumference of the seal member 33 is mounted and fixed.

In this constitution, it can increase the tightening force when detachably mounting the hull 3 on the upper part of the car body by plural lock means 26 by mounting the hull 3 on the car, also reduce the vibration and vibration sound of the hull 3 when the vehicle travels, and further assure sufficient air tightness and liquid tightness (sealing performance) between the vehicle 1 and the hull 3.

In the constitution shown in FIG. 10, other points are same in action and effect as in the foregoing embodiment, and same parts as in FIG. 5 are identified with same reference numerals in FIG. 10, and detailed description is omitted.

In the foregoing embodiments, the vehicle with hull is shown as a high roof type wagon, but the invention may be also applied to 4WD bus, other bus or other vehicles.

Alternatively, a window of reinforced glass completely sealed liquid tightly may be formed in the ship's bottom 2 or either end of the hull 3, and when the hull 3 is mounted on the car, the natural light may be admitted into the compartment through the window.

Figure 11:
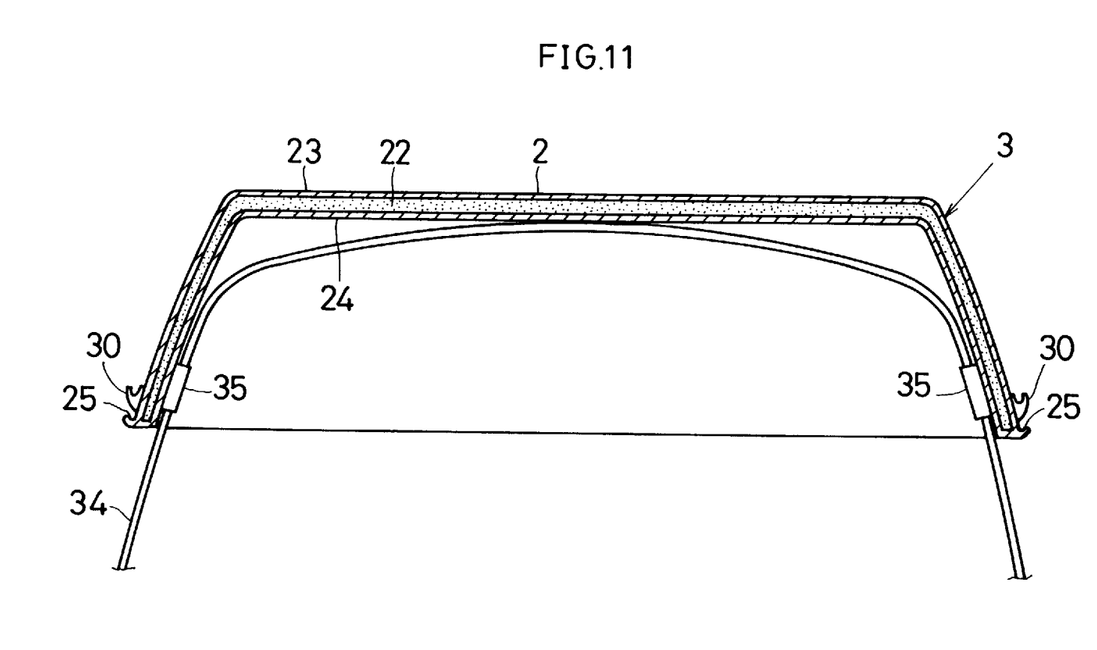
FIG. 11 is an explanatory diagram showing a different mode of use of a hull.

Moreover, as shown in FIG. 11, plural post support means 35 such as pipe members for supporting tent posts 34 may be combined or formed integrally at the inner side of the hull 3, and the hull 3 may be utilized as the roof of the tent, so that it may be utilized for other purposes than the boat.

I claim:

1. In a motor vehicle comprising an open top body and a dual purpose structure disposed on the open top of said body and means for removably holding said structure on said top of said body in a locked position and for enabling said structure to be removed from said top of said body, whereby said structure serves as the roof of said body in the locked position and as a boat when removed from the top of the body, the improvement comprising:

said means for removably holding comprising:

a plurality of locking means for detachably fitting said structure onto said top of said body, said plurality of locking means comprising at least one locking means attached to each side of said body and to a front of said body and to a rear of said body close to said top of said body, a corresponding number of hook means attached to corresponding locations of said structure, wherein each of said locking means each comprises a rotatable engaging means connectable to said respective hook means, and lever means for pulling the engaging means against said hook means to lock the structure onto said top of said body in said locked position, and to release the engaging means from hook means and thereby release the structure from being locked to the top of said body in a released position, so that the structure is readily locked and unlocked from said top of said body by manual operation and without use of tools;

a plurality of roll bars disposed transverse to a longitudinal direction of said body and connected to said body and on top thereof, said roll bars being of suitable strength to provide reinforcement of the top of said body, and frame means fitted around and connected to the open top of said body and connected to said plurality of roll bars, so that said structure is stably held on said top of said body; and means fitted over said plurality of roll bars for covering said open top of said body when said structure is removed from said body, and comprising a flexible sheet of waterproof material, said sheet being rolled up when said structure is locked on top of said body, and being unrolled to be on top of and be held in place by said plurality of roll bars so as to cover the open top of said body when said structure is removed from the top of said body; and wherein said structure comprises a channel around an edge thereof which fits on said frame means and forms a gutter for said vehicle when said structure is locked on top of said body.

2. The vehicle of claim 1, wherein said vehicle comprises a high roof wagon or bus.

\* \* \* \* \*